Oct. 7, 1958     W. E. SCHADE     2,854,891
REVERSIBLE MAGNIFYING ATTACHMENT FOR LENSES
Filed Oct. 1, 1956     2 Sheets-Sheet 1
Fig. 1
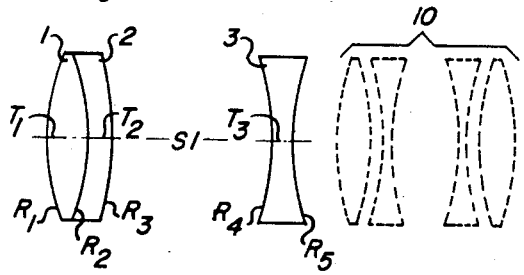
Fig. 2
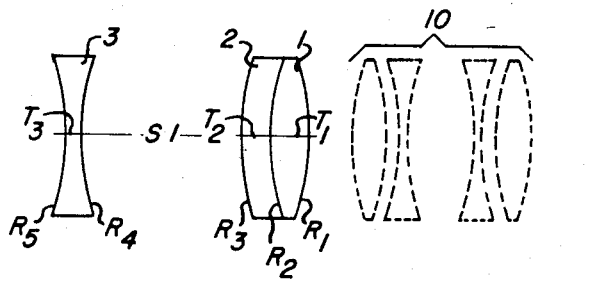
Fig. 4
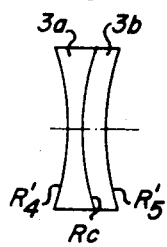
Fig. 3
| LENS | N | V | RADII | THICKNESS |
|---|---|---|---|---|
| | MAGN = 1.25 | | | |
| 1 | 1.523 | 58.6 | $R_1 = +80.00$ MM | $T_1 = 4.80$ MM |
| 2 | 1.617 | 36.6 | $R_2 = -80.00$ | $T_2 = 2.40$ |
| | | | $R_3 = -129.9$ | $S_1 = 16.39$ |
| 3 | 1.611 | 57.2 | $R_4 = -95.98$ | $T_3 = 2.40$ |
| | | | $R_5 = +100.6$ | |
WILLY E. SCHADE
INVENTOR.
BY Daniel J. Mayne
Harold F. Bennett
ATTORNEY & AGENT Oct. 7, 1958    W. E. SCHADE    2,854,891
REVERSIBLE MAGNIFYING ATTACHMENT FOR LENSES
Filed Oct. 1, 1956    2 Sheets-Sheet 2

WILLY E. SCHADE
INVENTOR.

BY Daniel J. Mayne
Harold F. Bennett
ATTORNEY & AGENT

United States Patent Office 2,854,891
Patented Oct. 7, 1958

2,854,891

REVERSIBLE MAGNIFYING ATTACHMENT FOR LENSES

Willy E. Schade, Rochester, N. Y., assignor to Eastman Kodak Company, Rochester, N. Y., a corporation of New Jersey Application October 1, 1956, Serial No. 613,110

2 Claims. (Cl. 88—57)

This invention relates to reversible afocal attachments for photographic objectives and similar objectives.

The object of the invention is to provide an afocal lens attachment which, when attached to a photographic objective with one end forward, converts the objective into a telephoto system and when attached with the other end forward converts the objective into a wide-angle system, and to provide such an attachment which is acceptably corrected for abberations in either position.

Magnifying (or minifying) lens attachments generally comprise a positive member and a negative member axially aligned and optically separated by the difference of their equivalent focal lengths to render the attachment afocal. When the positive member is to the front, the attachment operates as a telephoto attachment so that the focal length of the combination is greater than that of the objective alone, and when the negative member is to the front, it operates to shorten the focal length of the objective. Heretofore it has been customary to design such attachments for use exclusively as a telephoto attachment or as a wide-angle attachment having a magnification of ⅔ to ½ in the one case or 1½ to 2 in the other. This range is given as typical and not as restrictive.

It has long been known theoretically that such attachments can be reversed in position, in which case the magnification is the reciprocal of that in the normal position, but it has been generally considered that this is not practical because when the lens components are so shaped as to correct the abberations in one position, they are of the wrong shape to correct the aberrations in the reverse position and because the rear component is generally made with a smaller diameter so that when the attachment is reversed it restricts the field intolerably.

I have discovered that a reversible afocal lens attachment can be satisfactorily corrected for the usual aberrations when used in conjunction with a well-corrected objective and that such a system may be comparatively simple in structure if the magnification is made greater than 0.7 when in the wide-angle position and less than the reciprocal of this when in the telephoto position. The magnification in the former position should be less than 0.9 if the attachment is to be of substantial benefit in a practical way.

According to the invention, a substantially afocal reversible lens attachment is made up comprising a biconvex cemented doublet component having a positive focal length $f$ and biconcave component having a focal length between $-0.7\,f$ and $-0.9\,f$ optically spaced therefrom by approximately the numerical difference between the focal lengths of the two components, in which the radii of curvature $R_1$ to $R_5$ of the three optical surfaces of the biconvex component and of the two glass air surfaces of the biconcave component numbered in order, are within the following limits:

$$0.7\,f < +R_1 < 0.9\,f$$
$$0.6\,f < -R_2 < f$$
$$1.1\,f < -R_3 < 1.7\,f$$
$$0.8\,f < -R_4 < 1.2\,f$$
$$0.85\,f < +R_5 < 1.3\,f$$

in which the refractive indices $N_1$ and $N_2$ of the elements of the biconvex doublet numbered in order in the same direction, are within the following limits:

$$1.48 < N_1 < 1.57$$
$$1.58 < N_2 < 1.67$$

and in which the refractive index of each element in the biconcave component is between 1.58 and 1.67, the two components being of at least approximately the same diameter and being mounted in a lens tube each end of which is selectively attachable to the front of a standard objective.

Preferably, the biconcave component is a simple lens element, although a small degree of improvement can be obtained by making the biconcave component an achromatic doublet. In the accompanying drawings:

Fig. 1 is a diagrammatic axial section of a lens attachment according to the invention arranged for operation as a telephoto converter.

Fig. 2 is a similar diagram of the same system arranged for use as a wide-angle converter.

Fig. 3 is a table of constructional data for a preferred embodiment of the invention.

Fig. 4 shows an optional form of the negative member of the lens attachment.

Figure 5:
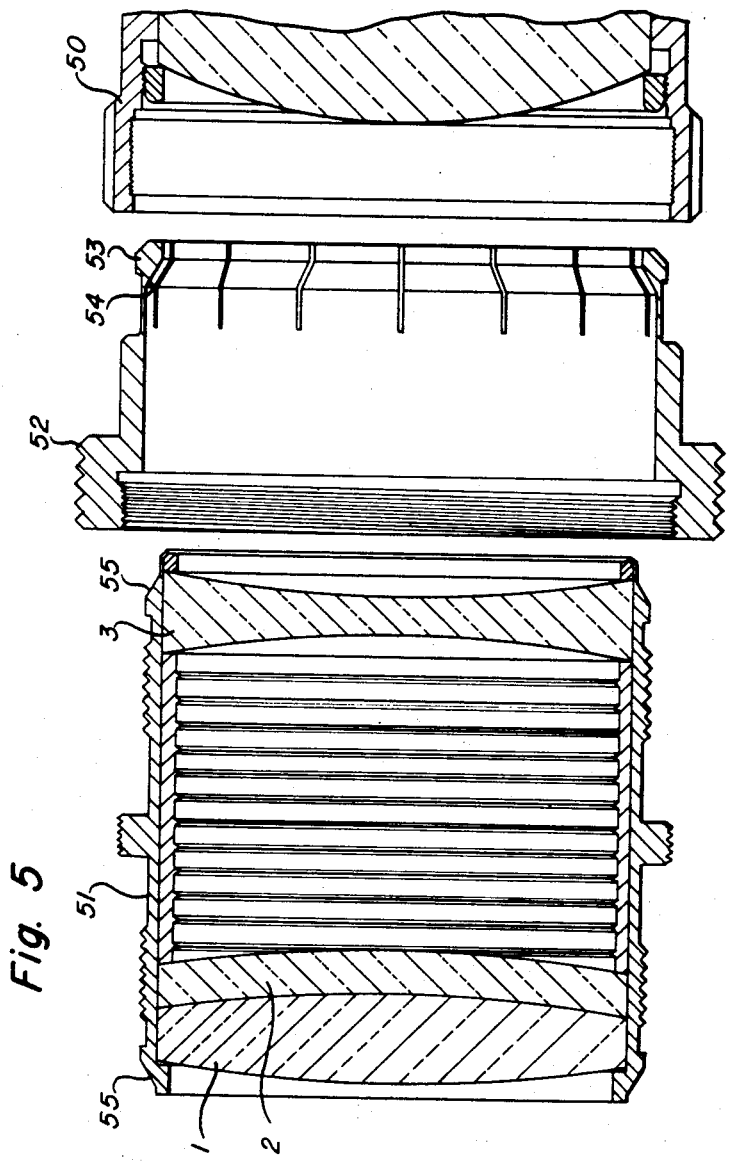
Fig. 5 shows a method of reversibly mounting the attachment.

In Fig. 1 a lens attachment according to the invention is mounted in axial alignment with and in front of a standard objective 10 shown in dotted lines. The attachment comprises a positive member made up of lens elements 1 and 2 and spaced therefrom a negative member made up of a single lens element 3. The positive member is biconvex and the negative member is biconcave in accordance with a preferred feature of the invention. The focal length of the negative member is numerically between 0.7 and 0.9 times the focal length of the positive member and the two members are afocally spaced apart, that is, they are spaced so that the distance between the rear principal point of the positive member and the front principal point of the negative member is equal to the difference in the focal lengths whereby the whole system shown in Fig. 1 has a focal length between 1.43 and 1.11 times that of the standard objective 10 alone.

Fig. 2 shows the same attachment made up of elements 1, 2 and 3 reversed in position and again axially aligned with the standard lens 10. In this case, the magnification is the reciprocal of that in Fig. 1, that is, the focal length of the whole system shown in Fig. 2 is between 0.7 and 0.9 times that of the standard objective 10 alone.

Although the attachment is reversible, the front of the attachment is assumed to be the positive member for the sake of being definite.

Fig. 3 is a table showing constructional data for a preferred embodiment of the invention given on a scale such that the focal length of the positive member is 100 mm., that of the negative member being then about 80 mm.

This data is as follows:

| Lens | N | V | Radii, mm. | Thicknesses, mm. |
|---|---|---|---|---|
| 1 | 1.523 | 58.6 | $R_1 = +80.00$ | $t_1 = 4.80$ |
| 2 | 1.617 | 36.6 | $R_2 = -80.00$ | $t_2 = 2.40$ |
|  |  |  | $R_3 = -129.9$ | $s_1 = 16.39$ |
| 3 | 1.611 | 57.2 | $R_4 = -95.98$ | $t_3 = 2.40$ |
|  |  |  | $R_5 = +100.6$ |  |

In this table as in Fig. 3, the lens elements are numbered in the first column in order from the front as above defined to the rear, the corresponding refractive indices N for the D line of the spectrum and the conventional dispersive indices V are given in the next two columns and the radii of curvature R of the lens surfaces, the thicknesses $t$ of the lens elements and the axial separations $s$ of the lens components, each numbered by subscripts from the front to rear, are given in the last two columns. The + and — values of the radii indicate surfaces respectively convex and concave to the front.

It will be directly evident from the table that the refractive indices and the radii of curvature are within the preferred ranges set forth above in the statement of the invention. The aforementioned nodal points of the separate members are within the lenses so that the space $S_1$ between the members is less than the optical separation which is 20 mm. The diameters of all the lens elements 1, 2 and 3 are equal or substantially equal to minimize the vignetting at the edges of the field in both positions of the attachment.

Fig. 4 shows an optional form of the negative member of the invention made up of two lens elements 3a and 3b cemented together. Conveniently these two lens elements are made of two types of glass having the same refractive index but different dispersive indices. For example, the negative element 3a may be made of a dense barium crown, $N=1.6173$ and $V=55.0$ and the positive element 3b of a dense flint, $N=1.617$ and $V=36.6$. Using this arrangement, commonly known as a buried surface, the curvature of the cemented surface $R_c$ can be readily computed by known methods so as to give the best compromise of color correction in the two positions without affecting the correction of monochromatic aberrations.

Fig. 5 shows one method of reversibly mounting the attachment. The lens elements 1, 2, 3 are shown mounted in the usual fashion in a metal tube 51 which is threaded to screw into a collet 52. The lens tube 51 is threaded at the middle so that either end may be screwed into the collet 52. The collet 52 is provided with an expandable portion 53 which normally has an inwardly tapering bore 54 near the end thereof, and the lens tube 51 has a tapering outer diameter 55 at each end so that as it is screwed into the collet 52 it expands the expandable part 53 for gripping firmly the inner surface of the forwardly extending lens tube 50 of the standard lens shown fragmentarily. The expandable part of the collet may be made by slotting the portion 53 longitudinally or in other ways. This mount is shown and described in greater detail in a copending patent application, Ser. No. 628,443, filed December 14, 1956, by my colleague Charles M. Lee.

I claim:

1. A substantially afocal reversible lens attachment comprising a biconvex cemented doublet component having a positive focal length $f$ and a biconcave component consisting of a single lens element and having a focal length between $-0.7\,f$ and $-0.9\,f$ optically spaced therefrom by approximately the numerical difference between the focal lengths of the two components, in which the radii of curvature $R_1$ to $R_5$ of the three optical surfaces of the biconvex component and of the two surfaces of the biconcave component, numbered in order, are within the following limits:

$$0.7\,f < +R_1 < 0.9\,f$$
$$0.6\,f < -R_2 < f$$
$$1.1\,f < -R_3 < 1.7\,f$$
$$0.8\,f < -R_4 < 1.2\,f$$
$$0.85\,f < +R_5 < 1.3\,f$$

in which the refractive indices $N_1$ to $N_3$ of the lens elements numbered in order in the same direction, are within the following limits:

$$1.48 < N_1 < 1.57$$
$$1.58 < N_2 < 1.67$$
$$1.58 < N_3 < 1.67$$

the two components being of at least approximately the same diameter and being mounted in a lens tube each end of which is selectively attachable to the front of a standard objective.

2. A substantially afocal lens system comprising a positive member and a negative member spaced therefrom and made substantially according to the following specifications:

| Lens | N | V | Radii | Thicknesses |
|---|---|---|---|---|
| 1 | 1.52 | 59 | $R_1 = +0.8\,f$ | $t_1 = 0.05\,f$ |
| 2 | 1.62 | 37 | $R_2 = -0.8\,f$ | $t_2 = 0.02\,f$ |
|   |      |    | $R_3 = -1.3\,f$ | $s_1 = 0.16\,f$ |
| 3 | 1.61 | 57 | $R_4 = -0.95\,f$ | $t_3 = 0.02\,f$ |
|   |      |    | $R_5 = +1.0\,f$ |  | where the lens elements are numbered in the first column in order from the front of the system to the rear, the front being designated for convenience as being at the positive member, where the corresponding refractive indices N for the D spectral line and the conventional dispersive indices V are given in the second and third columns, where the radii of curvature R of the lens surfaces, the thicknesses $t$ of the lens elements, and the air-spaces $s$ between lens elements, each numbered in order in the same sense, are given in the last two columns, where the + and — values of the radii R indicate surfaces respectively convex and concave to the front, and where $f$ is the focal length of the positive member comprising elements 1 and 2.

References Cited in the file of this patent

UNITED STATES PATENTS

| 1,980,147 | Wolfe | Nov. 6, 1934 |
| 2,184,018 | Ort | Dec. 19, 1939 |

FOREIGN PATENTS

| 722,817 | France | Jan. 5, 1932 |
| 730,867 | France | May 23, 1932 |